United States Patent

[11] 3,611,115

| [72] | Inventor | Holger Siebers<br>Friedbach, Switzerland |
|---|---|---|
| [21] | Appl. No. | 67,037 |
| [22] | Filed | Aug. 26, 1970 |
| [45] | Patented | Oct. 5, 1971 |
| [73] | Assignee | Landig & Gyr, AG<br>Zug, Switzerland |
| [32] | Priority | Sept. 12, 1969 |
| [33] | | Switzerland |
| [31] | | 13,781/69 |

[54] THREE-POINT REGULATOR COMPRISING OPERATIONAL AMPLIFIERS WITH COMMON INPUT
7 Claims, 1 Drawing Fig.

[52] U.S. Cl. .................................................. 323/19, 323/40, 330/103, 330/106, 330/108
[51] Int. Cl. .................................................. G05f 1/12
[50] Field of Search .......................................... 323/18, 19, 22 T, 40; 330/99, 103, 106, 108

[56] References Cited
UNITED STATES PATENTS

| 3,470,457 | 9/1969 | Howlett ........................ | 323/22 T |
| 3,512,101 | 5/1970 | Ellermeyer ................... | 330/99 |

*Primary Examiner*—Gerald Goldberg
*Attorney*—Morgan, Finnegan, Durham & Pine

ABSTRACT: A three-point regulator utilizing two zero threshold switches having symmetrical switching characteristics and having threshold voltages simultaneously, symmetrically adjustable by a single circuit element. A feedback network common to both threshold switches may also be employed to control the characteristics of the regulator.

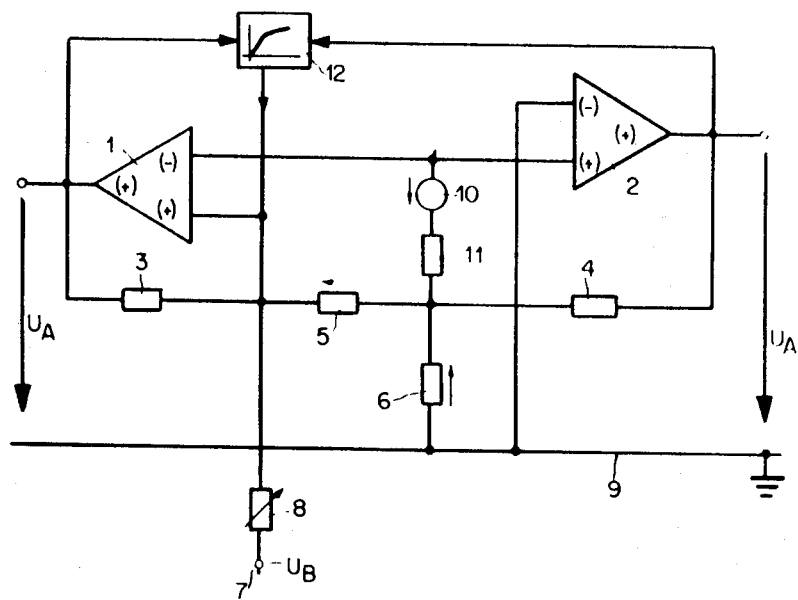

THREE-POINT REGULATOR COMPRISING OPERATIONAL AMPLIFIERS WITH COMMON INPUT

BACKGROUND AND BRIEF SUMMARY OF THE INVENTION

The invention relates to a three-point regulator with two zero threshold switches which may be provided with a common feedback network to control the regulator characteristics. The regulator may be used, for example, in control circuitry for regulating power supplies. An example of such control circuit is given at page 142 of "Handbook of Industrial Electronic Circuits" John Markus and Von Zeluff, McGraw Hill 1948, entitled "Servo Motor Automatically Adjusts Power Supply."

The control characteristics of two-point and three-point regulators may be substantially modified by the use of feedback networks, for example, to improve the regulation of regulating circuits. A two-point regulator with a time-delayed feedback has the behavior of a PD regulator, i.e., one whose output is proportional to the input and having a feedback signal proportional to the derivative of the output signal.

A two-point regulator with time delayed-yielding feedback has the behavior of a PID regulator, i.e., one whose output is proportional to the input signal and having a feedback signal proportional to the derivative and the integral of the output signal. The control characteristics of three-point regulators may be modified in a similar manner.

Generally, a two point regulator has a threshold switch which usually consists of a two-condition element and an initial voltage source or initial current source which determines the threshold voltage and/or the threshold current. In this case the two-condition element is a zero threshold switch which switches regeneratively when the voltage and/or current is zero. The output of the two-condition element can be returned to the input via an appropriately selected feedback network to provide the desired time behavior of the two-point regulator. A switching member such as a relay can be controlled by the output of the two-condition element.

For three-point regulators it is possible to use two threshold switches of this type, connected together in the circuit in suitable manner, each threshold switch having a different threshold voltage. In the known devices it is customary for each threshold switch to have its own initial voltage source and/or initial current source. The threshold voltages may, however, be of the same magnitude. In the latter situation when there is a positive control deviation, one threshold switch responds, and when there is a negative control deviation, of the same value, the other threshold switch responds. Feedback networks may be provided here too, for achieving a desired control characteristic. However, it is necessary for each threshold switch to have its own feedback network even if both feedback networks have the same time characteristic.

The disadvantage of the prior arrangement are overcome in the three-point regulator with two zero threshold switches according to the invention, in that the threshold values for both zero threshold switches may be simultaneously symmetrically adjustable by means of a simple adjustment common to both switches and in that a common feedback member may be used for both threshold switches.

BRIEF DESCRIPTION OF THE DRAWING

An illustrative embodiment of the invention is described in the following detailed specification which includes the drawing which is a schematic diagram of a three-point regulator utilizing two zero threshold switches.

DETAILED DESCRIPTION

The two threshold switches are formed by operational amplifiers 1 and 2 and their regenerative coupling resistors 3, 5 and 4, 6 respectively. The switching condition for a threshold switch is generally stated as $A \cdot H = 1$; wherein A indicates the amplification and H indicates the regenerative coupling factor. Both operational amplifiers 1 and 2 are normally reverse biased by the respective threshold voltage. When the input voltage of the threshold switch overcomes the threshold value, then the switching takes place. Return to the quiescent state takes place at a value which is given by the threshold value less the hysteresis voltage. If low threshold values are desired, then the hysteresis voltage must also be very small and must be maintained within narrow limits.

Referring to the drawing, the circuit configuration of the three-point regulator is as follows: One side of the voltage source 10 is connected to the (−) input of amplifier 1 and to the (+) input of amplifier 2. The other side of voltage source 10 is connected to resistors 5, 6 and 4. Resistor 6 is also connected to the (−) input of amplifier 2 which is at zero potential, while feedback resistor 4 goes to the output of amplifier 2. Resistor 5 is connected to variable resistor 8, the (+) input of amplifier 1, to feedback network 12 and to feedback resistor 3 which goes to the output of amplifier 1. Variable resistor 8 goes to a voltage source 7 while feedback network 12 is connected to the outputs of both amplifiers 1 and 2.

The typical values for the components shown in the schematic diagram are:

| | |
|---|---|
| Amplifiers 1 and 2 | Gain 20,000 |
| Resistors 3 and 4 | 100,000 ohms |
| Resistors 5 and 6 | 100 ohms |
| Resistor 8 | 150,000 ohms |

The threshold voltages are produced by means of a direct current source 7 to which a current flows through potentiometer 8 via resistors 5 and 6 from lead 9, which is at zero potential. The current takes the path described because resistors 3 and 4 and the input resistances of the operational amplifiers are greater by several orders of magnitude than that of resistors 5 and 6. The resistance of potentiometer 8 is also of the same order of magnitude as that of resistors 3 and 4, so that the current through resistors 5 and 6 can be considered to be dependent exclusively upon the potentiometer 8 and the direct current source 7. The voltage drop of the resistor 5, which is caused by the current flow, represents the threshold voltage for the zero threshold switch consisting of operational amplifier 1 and resistors 3 and 5. Similarly, the voltage drop on the resistor 6 forms the threshold voltage for the zero threshold switch consisting of operational amplifier 2 and resistors 4 and 6. Both threshold voltages are therefore simultaneously adjustable by means of the potentiometer 8. If resistors 5 and 6 are of the same value, the threshold voltages may be symmetrically adjusted by potentiometer 8.

In the regulator illustrated, a voltage source 10 represents the input voltage to the regulator. This normally corresponds to the difference between the actual value and the nominal value of the condition which is to be controlled. Resistor 11 represents the internal resistance of voltage source 10. Because of the manner in which the circuit elements are interconnected, the threshold voltages developed across resistors 5 and 6, respectively, normally reverse bias both operational amplifiers and the respective amplifier output voltages are at zero potential. The circuits including operational amplifiers 1 and 2 are so constructed that the output voltages $U_A$ either are zero, or assume positive values. If the input voltage, including its magnitude and its polarity, exceeds one of the threshold voltages, then the respective amplifier regeneratively changes state. Return to the quiescent state takes place when the input voltage drops below the threshold voltage by an amount equal to the hysteresis of the circuit.

The output voltages of the operational amplifiers are coupled back to the inputs via a feedback network 12 having a predetermined time behavior. The feedback network is connected to the point to which the resistors 3, 4 and 8 are connected. The use of a common feedback network, for both threshold switches is only possible because the signal flowing through resistors 5 and 6 in series adjusts for both threshold switches.

The illustrated circuit arrangement may be realized without great expenditure. A further advantage is the simple analysis of the switching characteristic. Thus, the hysteresis voltage for the threshold switch consisting of amplifier 1 and resistors 3 and 5 is given by the following formula:

$$U_H = U_A \cdot \left[\frac{R_5}{R_3+R_5} - \frac{1}{A}\right],$$

wherein $U_H$ indicates the hysteresis voltage, $U_A$ represents the full output voltage of the amplifier, and $A$ represents the amplification. The hysteresis voltage for the other threshold switch can be calculated in similar fashion. The hysteresis voltage, therefore, may be adjusted within very narrow limits by means of resistors 3 and 5 and/or 4 and 6, and also may be made very small.

The zero deviation, i.e., the deviation of the switching characteristic from the line of symmetry, is minimal in the arrangement shown. It consists of one-half the value of the sum of the offset voltages of the two operational amplifiers.

The switching characteristic is largely independent of variations in the value of resistor 11, as the input currents are very low and the negative resistances of the switching elements are very great. If the whole control circuit is supplied from the direct-current source 7, then both the input voltage and the threshold voltages vary with voltage fluctuations in current source 7. However, these variations mutually cancel one another, so that the sensitivity of the arrangement is not influenced by fluctuations in the supply voltage.

I claim:

1. A regulator for maintaining a desired condition including:
   a pair of regenerative threshold switches each including means for providing a threshold potential;
   an input circuit connected to both of said threshold switches for providing an input signal thereto causing said threshold switches to change state when said input signal exceeds the respective threshold potential; and
   circuit means including said means for providing said threshold potential for both of said threshold switches, said circuit means being operative to simultaneously adjust both threshold potentials.

2. The regulator according to claim 1 wherein said means for providing the threshold potentials for each of said threshold switches includes a resistor and wherein said circuit means includes said resistors connected in series so that a common current flow through said series connected resistors developes the threshold potentials for both of said threshold switches.

3. The regulator according to claim 1 further including a common feedback member for both of said threshold switches, said feedback member being connected to said means for providing threshold potentials for both of said switches to simultaneously affect both threshold potentials according to the potential appearing at the output of said threshold switches.

4. A regulator for maintaining a desired condition including:
   a pair of threshold switches, each said switch having a threshold voltage associated therewith and responsive to deviations from said desired condition which overcome said threshold voltage, thereby causing said threshold switch to change state regeneratively;
   a single means for simultaneously adjusting each said threshold voltage, and
   a common feedback network having a predetermined time behavior connected between the outputs of said threshold switches and the inputs thereof for controlling the characteristics of said regulator.

5. A three-point regulator for maintaining a desired condition including:
   an input circuit for providing an input signal related to deviations from said desired condition;
   two zero threshold switches having regenerative switching characteristics;
   biasing means associated with said switches for providing threshold voltages therefor so that when said input signal overcomes one said threshold voltages said switch associated therewith changes state regeneratively;
   a single adjustment means included in said biasing means for simultaneously adjusting said threshold voltages; and
   a common feedback network connected between the outputs of said zero threshold switches and the inputs thereof for controlling the characteristics of said regulator.

6. A regulator according to claim 5 in which said threshold switches are biased off by said threshold voltages in the absence of an input signal which overcomes one of said threshold voltages and wherein said threshold voltages are symmetrically adjustable by said single adjustment means.

7. A three-point regulator for maintaining a desired condition including;
   an input circuit for providing an input signal related to deviations from said desired condition;
   two zero threshold switches having regenerative switching characteristics;
   biasing means associated with said switches for providing threshold voltages therefor so that when said input signal overcomes one of said threshold voltages said switch associated therewith changes state regeneratively;
   said biasing means including a pair of resistors connected in series combination,
   said combination connected between the inputs of said switches and to a variable resistive element so that current flows in series through said pair of resistors and said variable element,
   said current flow through said resistors establishing said threshold voltages,
   said current flow being controlled by said variable element; and
   a common feedback network connected between the outputs of said switches and said pair of resistors for controlling the characteristics of said regulator.